(12) United States Patent
Kamran et al.

(10) Patent No.: US 11,249,800 B2
(45) Date of Patent: Feb. 15, 2022

(54) SYSTEM AND METHOD FOR DYNAMIC CPU MULTITASKING

(71) Applicant: EMC IP Holding Company, LLC, Hopkinton, MA (US)

(72) Inventors: Lior Kamran, Rishon LeZion (IL); Vitaly Zharkov, Modiin (IL); Amitai Alkalay, Kadima (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 114 days.

(21) Appl. No.: 16/665,466

(22) Filed: Oct. 28, 2019

(65) Prior Publication Data

US 2021/0124609 A1  Apr. 29, 2021

(51) Int. Cl.
*G06F 9/46* (2006.01)
*G06F 9/48* (2006.01)

(52) U.S. Cl.
CPC ........... *G06F 9/4881* (2013.01); *G06F 9/485* (2013.01)

(58) Field of Classification Search
CPC ............................. G06F 9/4881; G06F 9/485
See application file for complete search history.

(56) References Cited

U.S. PATENT DOCUMENTS

| | | | | |
|---|---|---|---|---|
| 7,584,475 B1* | 9/2009 | Lightstone | ............... | G06F 9/50 348/14.01 |
| 8,601,493 B2* | 12/2013 | Minemura | .......... | G06F 11/1438 719/318 |
| 2011/0149919 A1* | 6/2011 | Kapoor | ................ | H04L 1/1848 370/336 |
| 2011/0202926 A1* | 8/2011 | Chambliss | ............ | G06F 9/5038 718/104 |
| 2018/0095675 A1* | 4/2018 | Kachare | ............... | G06F 3/0611 |

* cited by examiner

*Primary Examiner* — Camquy Truong
(74) *Attorney, Agent, or Firm* — Brian J. Colandreo; Mark H. Whittenberger; Holland & Knight LLP (57) ABSTRACT

A method, computer program product, and computing system for determining a block application execution utilization on a central processing unit (CPU) of the computing device. A non-block application execution utilization on the CPU may be determined. A CPU execution release interval and CPU execution release duration for the block application may be generated based upon, at least in part, the block application execution utilization and the non-block application execution utilization.

19 Claims, 6 Drawing Sheets

SYSTEM AND METHOD FOR DYNAMIC CPU MULTITASKING

BACKGROUND

Storing and safeguarding electronic content may be beneficial in modern business and elsewhere. Accordingly, various methodologies may be employed to protect and distribute such electronic content.

Several applications (e.g., block applications, file applications, etc.) may share a central processing unit (CPU). For example, a block application may voluntarily release of the CPU to allow other applications to also utilize the CPU. However, frequent attempts for CPU release may lead to significant performance degradation due to the incurred overhead.

SUMMARY OF DISCLOSURE

In one example implementation, a computer-implemented method executed on a computing device may include, but is not limited to, determining a block application execution utilization on a central processing unit (CPU) of the computing device. A non-block application execution utilization on the CPU may be determined. A CPU execution release interval and CPU execution release duration for the block application may be generated based upon, at least in part, the block application execution utilization and the non-block application execution utilization.

One or more of the following example features may be included. The CPU may be released from executing the block application for a predefined CPU execution release duration and a predefined CPU execution release interval based upon, at least in part, the CPU execution release interval and the CPU execution release duration. Determining the block application execution utilization on the CPU may include determining a percentage of time the block application is idle, and determining a percentage of time the block application is used. Determining the non-block application execution utilization on the CPU may include determining a CPU execution release time and a CPU execution resume time associated with the block application. Generating the CPU execution release interval and the CPU execution release duration for the block application may include comparing the block application utilization against one or more block application utilization thresholds, and comparing the non-block application utilization against one or more non-block application utilization thresholds. Generating the CPU execution release interval and the CPU execution release duration for the block application may include incrementally adjusting one or more of a previous CPU execution release interval and a previous CPU execution release duration. Generating the CPU execution release interval and the CPU execution release duration for the block application may include one or more of increasing the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds, and decreasing the previous CPU execution release interval and increasing the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds.

In another example implementation, a computer program product resides on a computer readable medium that has a plurality of instructions stored on it. When executed by a processor, the instructions cause the processor to perform operations that may include, but are not limited to, determining a block application execution utilization on a central processing unit (CPU) of the computing device. A non-block application execution utilization on the CPU may be determined. A CPU execution release interval and CPU execution release duration for the block application may be generated based upon, at least in part, the block application execution utilization and the non-block application execution utilization.

One or more of the following example features may be included. The CPU may be released from executing the block application for a predefined CPU execution release duration and a predefined CPU execution release interval based upon, at least in part, the CPU execution release interval and the CPU execution release duration. Determining the block application execution utilization on the CPU may include determining a percentage of time the block application is idle, and determining a percentage of time the block application is used. Determining the non-block application execution utilization on the CPU may include determining a CPU execution release time and a CPU execution resume time associated with the block application. Generating the CPU execution release interval and the CPU execution release duration for the block application may include comparing the block application utilization against one or more block application utilization thresholds, and comparing the non-block application utilization against one or more non-block application utilization thresholds. Generating the CPU execution release interval and the CPU execution release duration for the block application may include incrementally adjusting one or more of a previous CPU execution release interval and a previous CPU execution release duration. Generating the CPU execution release interval and the CPU execution release duration for the block application may include one or more of increasing the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds, and decreasing the previous CPU execution release interval and increasing the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds.

In another example implementation, a computing system includes at least one processor and at least one memory architecture coupled with the at least one processor, wherein the at least one processor is configured to determine a block application execution utilization on a central processing unit (CPU) of the computing device. The at least one processor may be further configured to determine a non-block application execution utilization on the CPU. The at least one processor may be further configured to generate a CPU execution release interval and CPU execution release duration for the block application based upon, at least in part, the block application execution utilization and the non-block application execution utilization.

One or more of the following example features may be included. The CPU may be released from executing the block application for a predefined CPU execution release duration and a predefined CPU execution release interval based upon, at least in part, the CPU execution release interval and the CPU execution release duration. Determining the block application execution utilization on the CPU may include determining a percentage of time the block application is idle, and determining a percentage of time the block application is used. Determining the non-block application execution utilization on the CPU may include determining a CPU execution release time and a CPU execution resume time associated with the block application. Generating the CPU execution release interval and the CPU execution release duration for the block application may include comparing the block application utilization against one or more block application utilization thresholds, and comparing the non-block application utilization against one or more non-block application utilization thresholds. Generating the CPU execution release interval and the CPU execution release duration for the block application may include incrementally adjusting one or more of a previous CPU execution release interval and a previous CPU execution release duration. Generating the CPU execution release interval and the CPU execution release duration for the block application may include one or more of increasing the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds, and decreasing the previous CPU execution release interval and increasing the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
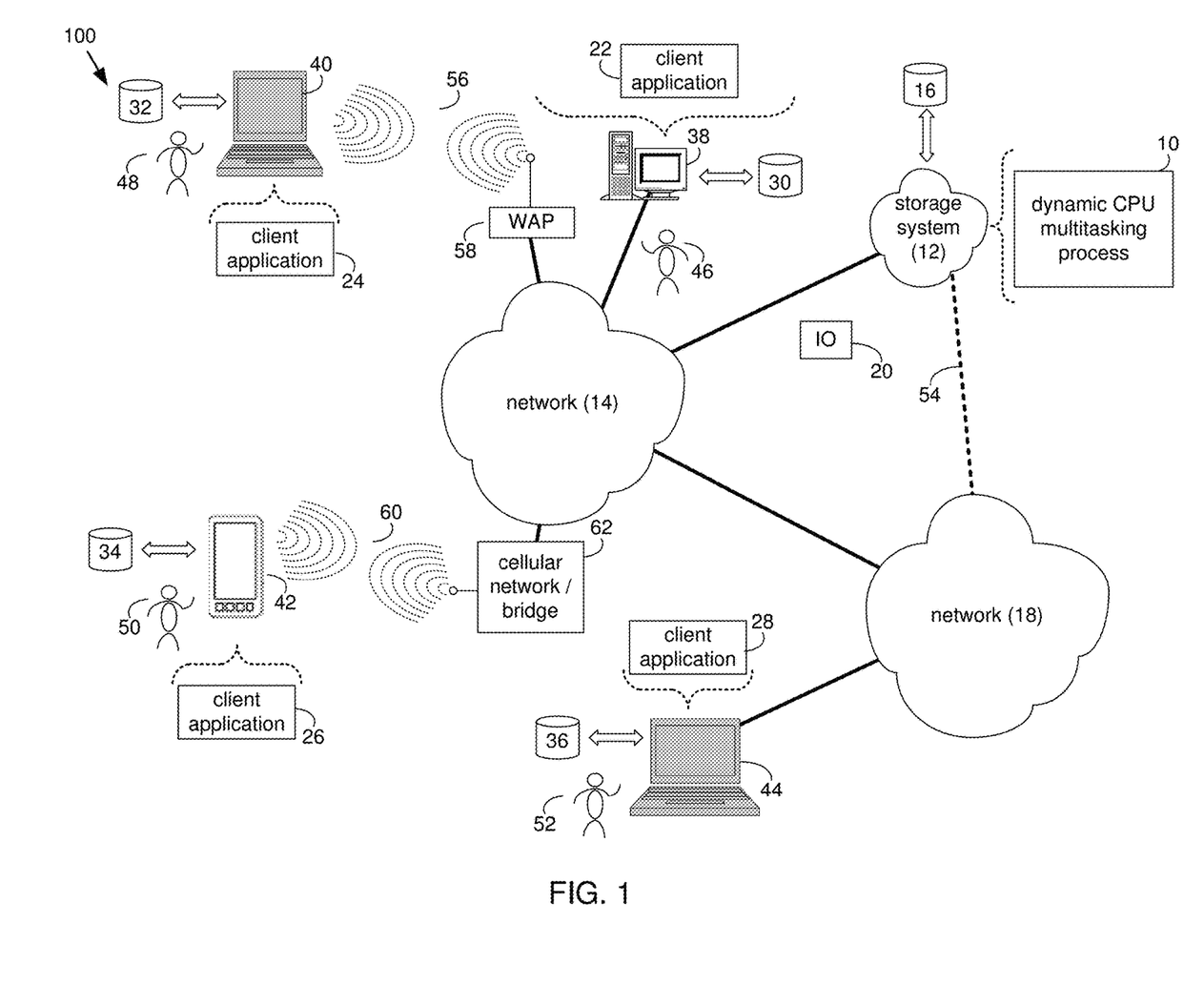
FIG. 1 is an example diagrammatic view of a storage system and a dynamic CPU multitasking process coupled to a distributed computing network according to one or more example implementations of the disclosure.

System Overview:
Referring to FIG. 1, there is shown dynamic CPU multitasking process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of dynamic CPU multitasking process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of dynamic CPU multitasking process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a dynamic CPU multitasking process, such as dynamic CPU multitasking process 10 of FIG. 1, may include but is not limited to, determining a block application execution utilization on a central processing unit (CPU) of the computing device. A non-block application execution utilization on the CPU may be determined. A CPU execution release interval and CPU execution release duration for the block application may be generated based upon, at least in part, the block application execution utilization and the non-block application execution utilization.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
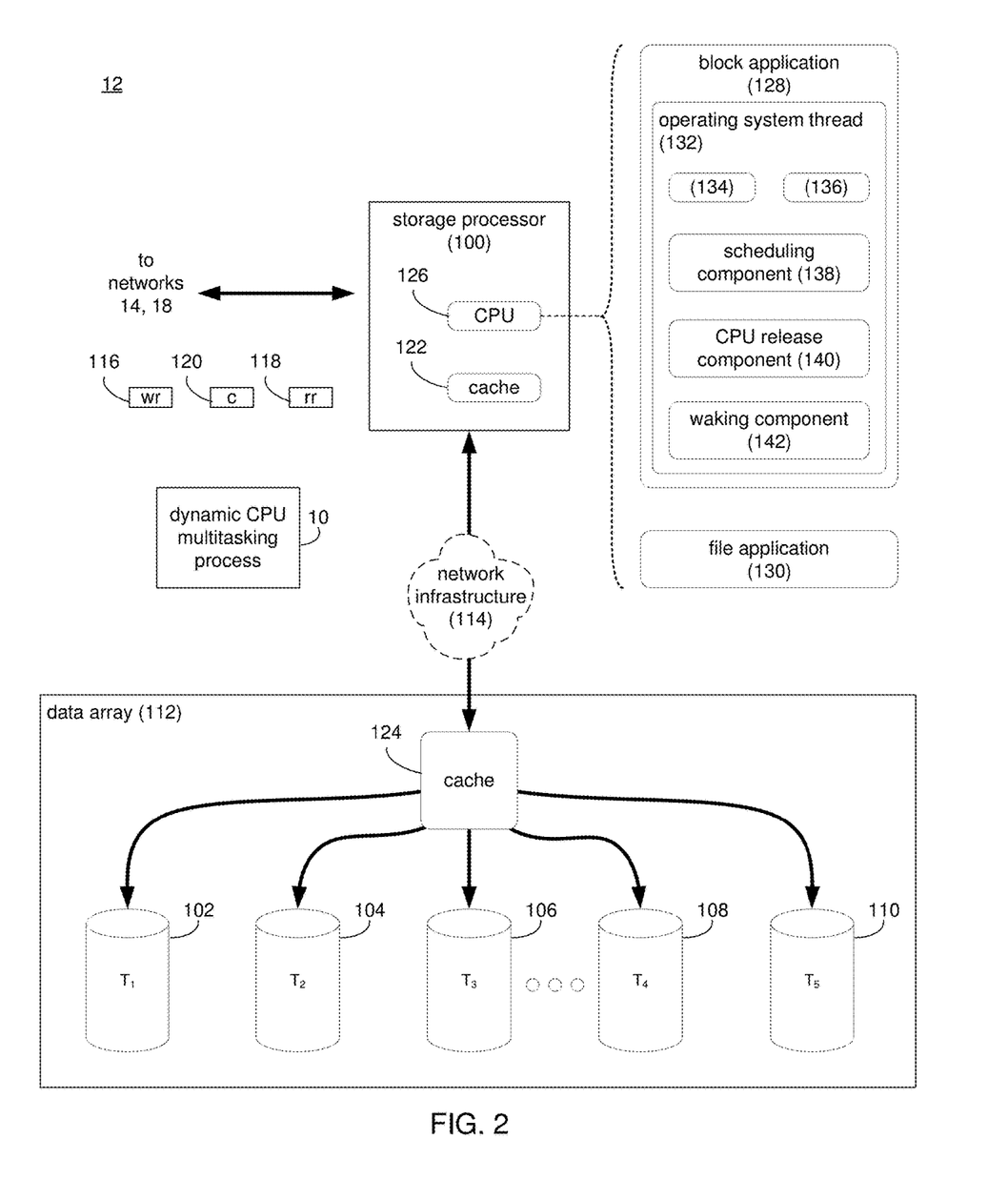
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-$n$ (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of dynamic CPU multitasking process 10. The instruction sets and subroutines of dynamic CPU multitasking process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of dynamic CPU multitasking process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of dynamic CPU multitasking process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of dynamic CPU multitasking process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage processor 100 may include one or more central processing units (CPUs) (e.g., CPU 126). In some implementations, the one or more CPUs may include a multicore CPU. As is known in the art, a multicore CPU may be configured to execute multiple threads or processes concurrently on each core. However, it will be appreciated that CPU 126 may not be a multicore CPU within the scope of the present disclosure. In some implementations, CPU 126 may execute one or more applications (e.g., block application 128 and file application 130). A block application (e.g., block application 128) may generally execute a single operating system thread per CPU core of a multicore CPU (e.g., CPU 126), which may implement block functionality on data array 112.

In some implementations, block application 128 may run on top of a Preemptive Operating System (OS). As is known in the art, a Preemptive OS generally allows the operating system to preempt (i.e. stop) a running operating system thread without the operating system thread's cooperation, and execute something else, for example another operating system thread. An operating system thread may generally include multiple sub-threads as lightweight implementations of an operating system thread. For example, block application 128 may include an operating system thread (e.g., operating system thread 132) with a plurality of sub-threads (e.g., sub-threads 134, 136). While an example of e.g., one operating system thread with e.g., two sub-threads has been described above, it will be appreciated that any number of operating system threads and sub-threads for each operating system thread may be used within the scope of the present disclosure. In some implementations, a file application (e.g., file application 130) may generally organize data as a single piece of information inside a folder within data array 112. When data from a particular folder or file needs to be accessed, storage processor 100 requires a path to locate the data within data array 112.

In some implementations, each operating system thread (e.g., operating system thread 132) may implement a scheduling component (e.g., scheduling component 138) configured to schedule the execution of the plurality of sub-threads (e.g., sub-threads 134, 136). In some implementations, each operating system thread (e.g., operating system thread 132) may be configured to poll its interfaces for new events (e.g., polling for completions of submitted IO requests to data array 112) and polls for new IO requests from the user (e.g., client devices 38, 40, 42, 44). Accordingly, each operating system thread may fully utilize the CPU or CPU core it's running on, because even when there's no actual work, the operating system thread may continuously check its interfaces. In some implementations, this always-polling design may be optimized for a storage system that requires low latency and high IOPS (I/O per second) as there are no context switches and no interrupts involved.

In some implementations, storage system 12 may process background operations which may run during the processing of IO requests from a user, but also when no IOs are present. In some implementations, background operations may include compression, de-duplication, meta-data defragmentation, calculation of RAID protection from media failures, etc. Furthermore, storage system 12 may defer some background processing to be executed when there is less IO load from the user, to serve IO requests more quickly, thus reducing the latency and improving the storage system performance. In some implementations, background operations may be a fundamental part of storage system 12. For example, suppose storage system 12 includes a log-structured file system (LFS) that performs defragmentation and garbage collection on metadata. Accordingly, the ability to multitask background IO requests may contribute to the efficient operation of storage system 12.

As discussed above, suppose storage system is required to run another application, for example a file application (e.g., file application 130). Storage system use patterns may dynamically change over time (i.e. the user of the system can use only the block application for some time and then use only the file application, and it can also use both of them simultaneously, each with a different load that can also change. Therefore, storage system 12 may be required to dynamically adapt to the user operation pattern of the two applications to support dynamic load balancing. As will be discussed in greater detail below, dynamic CPU multitasking process 10 may allow storage system 12 to dynamically multitask CPU operations for sub-threads (e.g., sub-threads 134, 136) of an operating system thread (e.g., operating system thread 132) of a block application (e.g., block application 128) and other non-block applications (e.g., file application 130).

The Dynamic CPU Multitasking Process:

Referring also to FIGS. 3-8 and in some implementations, dynamic CPU multitasking process 10 may determine 300 a block application execution utilization on a central processing unit (CPU) of the computing device. A non-block application execution utilization on the CPU may be determined 302. A CPU execution release interval and CPU execution release duration for the block application may be generated 304 based upon, at least in part, the block application execution utilization and the non-block application execution utilization.

As will be discussed in greater detail below, implementations of the present disclosure may allow a block application and a non-application to efficiently share a CPU by dynamically adjusting CPU release times and/or CPU release durations. Dynamic CPU multitasking process 10 may provide a way for a block application (e.g., block application 128) to share the CPU with the other applications. In some implementations, dynamic CPU multitasking process 10 may involve the voluntarily release of the CPU by block application 128, to allow other applications (e.g., file application 130) to also utilize the CPU. However, frequent attempts for CPU release may lead to significant performance degradation due to the incurred overhead.

For example, if block application 128 releases the CPU every e.g., 50 μs for e.g., 50 μs, and file application 130 only consumes e.g., 20 μs each time, and that each context-switch takes e.g., 2 μs, then the overhead may be about e.g., 5.4% (4/(4+50+20)). Alternatively, if block application 128 releases the CPU every e.g., 100 μs, and file application 130 consumes e.g., 40 μs, then the overhead will be about 2.7%, which is half the overhead of the first distribution.

In addition, if file application 130 does not need the CPU, there may not be any context-switches, but there will still be a penalty resulting from block application decreasing and increasing its priority every e.g., 50 μs. Assuming priority change take about 1 μs, then the overhead may be be about 3.84% (2/(2+50)). Alternatively, if block application 128 would try to release the CPU every e.g., 100 μs, then the overhead will be about 1.96%.

In some implementations of the present disclosure, dynamic CPU multitasking process 10 may determine the actual CPU usage of both applications and adapt the CPU release times and durations in order to minimize the overhead and improve the system performance. In this manner, dynamic CPU multitasking process 10 may "learn" the CPU requirements of block applications and non-block applications in order to reduce the number of context-switches (i.e., CPU cycles that are not used for any process).

In some implementations, dynamic CPU multitasking process 10 may utilize a priority system (e.g. priorities of the Real-Time scheduler in Linux®) of the scheduling component (e.g., scheduling component 138) in order to avoid this overhead.

In some implementations and as will be discussed in greater detail below, dynamic CPU multitasking process 10 may release the CPU by lowering the execution priority of the operating system thread below the execution priority of the non-block application for a defined period of time. In some implementations, when the operating system thread (e.g., operating system thread 132) releases the CPU (e.g., CPU 126), dynamic CPU multitasking process 10 may lower the execution priority of the operating system thread to be lower than the other non-block application for the defined period of time. In some implementations and referring also to the example of FIG. 4, dynamic CPU multitasking process 10 may execute first sub-thread 134 with a first execution priority (e.g., execution priority "p0"). In some implementations, the first execution priority (e.g., execution priority "p0") may be the highest possible priority that is lower than the execution priority of kernel jobs and, as will be discussed in greater detail below, higher than the execution priority of a non-block application (e.g., file application 130). In some implementations, dynamic CPU multitasking process 10 may release the CPU (e.g., after first sub-thread 134 has finished or has reached a breakpoint) by lowering the execution priority of operating system thread (e.g., from execution priority "p0" to execution priority "p1"). In this example, dynamic CPU multitasking process 10 may lower the execution priority of operating system thread 132 from "p0" to "p1" for the defined period of time starting from time "t0" to "t1" (e.g., the defined period of time).

In some implementations, dynamic CPU multitasking process 10 may execute one of a non-block application and a sub-thread of an operating system thread based upon, at least in part, an execution priority of the operating system thread and an execution priority of the application. Referring also to the example of FIG. 5 and in some implementations, dynamic CPU multitasking process 10 may define an execution priority for a non-block application (e.g., file application 130) to be lower than that of the operating system thread when the operating system thread is executing a sub-thread (e.g., first sub-thread 134) on the CPU (e.g., execution priority "p2"). In one example, suppose file application is ready to be executed on the CPU at time "t0". Referring also to the example of FIG. 6, dynamic CPU multitasking process 10 may execute the first sub-thread (e.g., first sub-thread 134) of operating system thread 132 on the CPU until dynamic CPU multitasking process 10 releases the CPU at time "t0" until time "t1". As discussed above and in some implementations, dynamic CPU multitasking process 10 may release the CPU from executing sub-threads of the operating system thread by lowering the execution priority of operating system thread 132 from priority "p0" to priority "p1". In this example, at time "t0", dynamic CPU multitasking process 10 may execute 304 file application 130 based upon, at least in part, an execution priority of the operating system thread and an execution priority of the application. For example, because file application 130 has a higher execution priority (e.g., execution priority "p2") than the operating system thread (e.g., execution priority "p1"), dynamic CPU multitasking process 10 may execute file application 130 on the CPU until time "t1".

Figure 4:
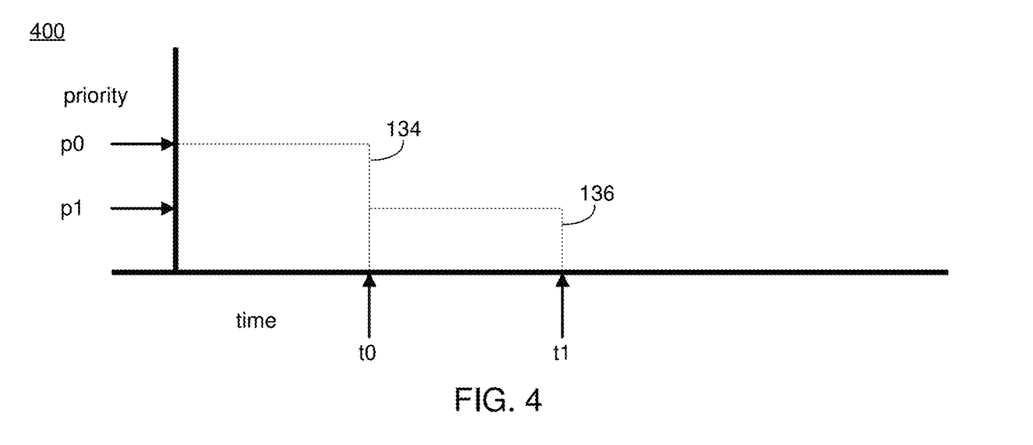
FIGS. 4-8 are example diagrammatic views of the execution of operating system threads and/or applications according to one or more example implementations of the disclosure.
Figure 5:
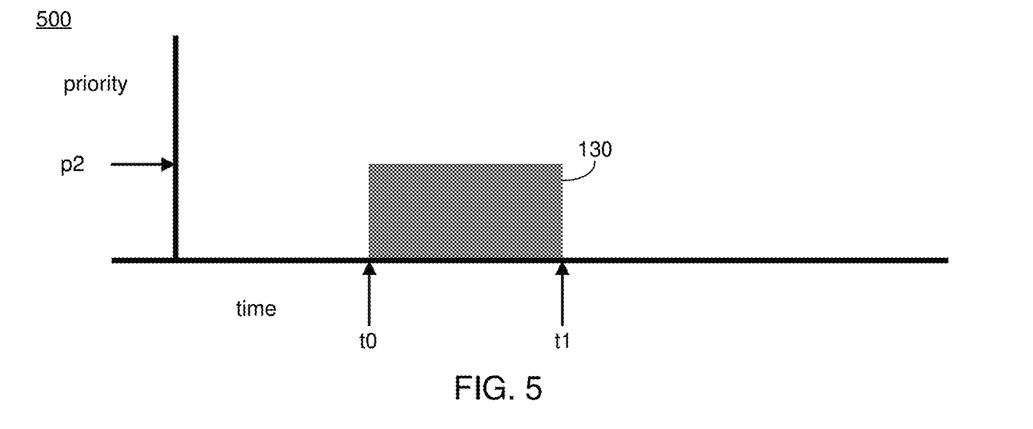
Figure 6:
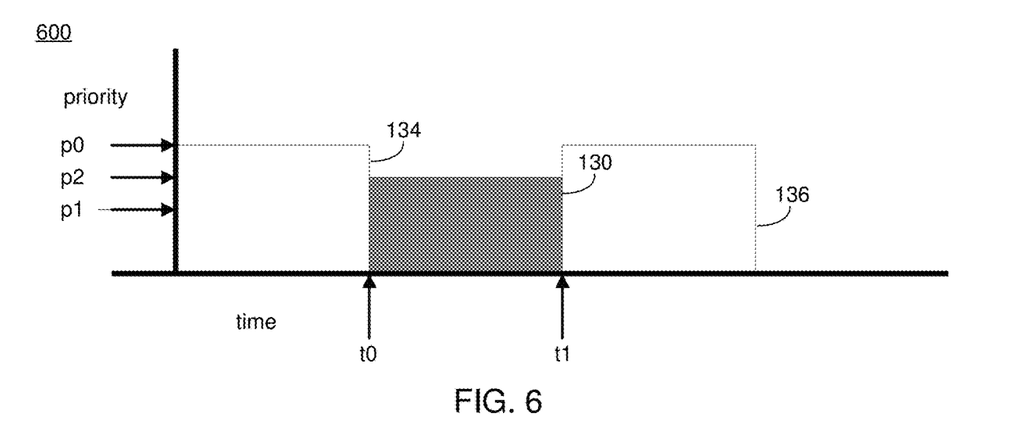

In some implementations, dynamic CPU multitasking process 10 may raise the execution priority of the operating system thread above the execution priority of the application after the defined period of time. Referring again to the example of FIG. 6 and in some implementations, dynamic CPU multitasking process 10 may raise the execution priority of operating system thread 132 after the defined period of time (e.g., after time "t1") from a lower execution priority (e.g., execution priority "p1") to a higher execution priority (e.g., execution priority "p0" which is higher than execution priority "p2" used for file applications). In some implementations, dynamic CPU multitasking process 10 may raise the execution priority of operating system thread 132 using another operating system thread. For example, dynamic CPU multitasking process 10 may cause another operating system thread to increase the priority of operating system thread 132. When its execution priority is increased from execution priority "p1" as shown in FIG. 4 to execution priority "p0" as shown in FIG. 6 at time "t1", operating system thread 132 may immediately get scheduled back and execute second sub-thread 136 on the CPU.

Figure 3:
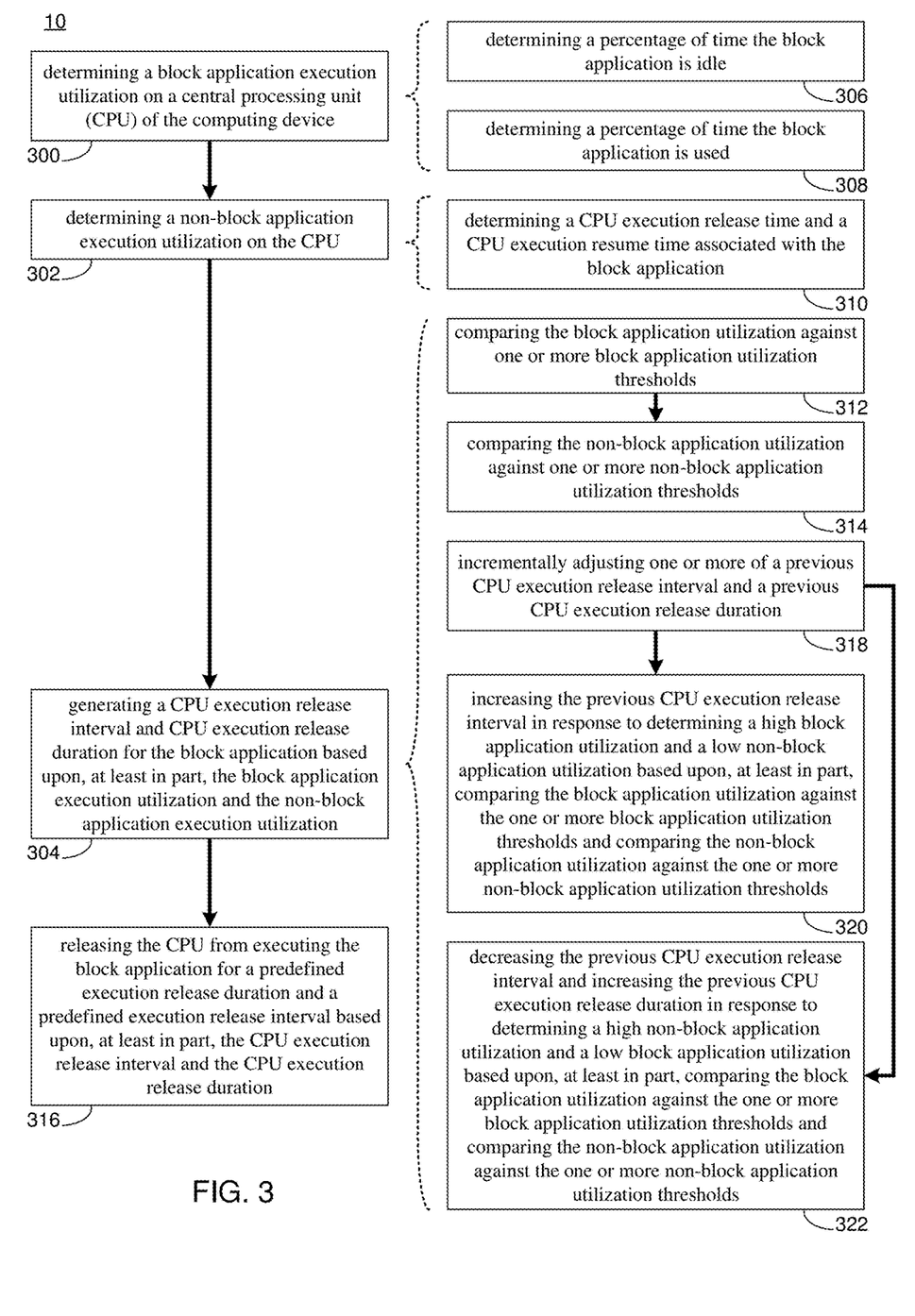
FIG. 3 is an example flowchart of dynamic CPU multitasking process according to one or more example implementations of the disclosure.

In some implementations, dynamic CPU multitasking process 10 may determine 300 a block application execution utilization on a central processing unit (CPU) of the computing device. As discussed above and in some implementations, a block application (e.g., block application 128) may generally execute a single operating system thread per CPU core of a multicore CPU (e.g., CPU 126), which may implement block functionality on data array 112. In some implementations, dynamic CPU multitasking process 10 may determine 300 a block application execution utilization by a block application (e.g., block application 128) on the CPU (e.g., CPU 126). For example, a block application execution utilization may generally include a measurement of an amount of time the block application is executed on the CPU.

In some implementations, determining 300 the block application execution utilization on the CPU may include determining 306 a percentage of time the block application is idle and determining 308 a percentage of time the block application is used. For example, dynamic CPU multitasking process 10 may measure the actual CPU usage of block application (e.g., block application 128) during a period of time. In some implementations, the block application (e.g., block application 128) may be the main application of the storage system (e.g., storage system 12) and because the block application decides when to release and CPU and for how long, dynamic CPU multitasking process 10 may determine 306 or measure the actual percentage of time the block application is idle (e.g., block application idle percentage (BIP)). In some implementations, dynamic CPU multitasking process 10 may similarly determine 308 or measure the actual percentage of time the block application is used (e.g., a block application used percentage (BUP)).

In some implementations, dynamic CPU multitasking process 10 may determine 302 a non-block application execution utilization on the CPU. As discussed above, a non-block application may generally include file applications, user applications, etc. In some implementations, a file application (e.g., file application 130) may generally organize data as a single piece of information inside a folder within data array 112. When data from a particular folder or file needs to be accessed, storage processor 100 requires a path to locate the data within data array 112.

In some implementations, determining 302 the non-block application execution utilization on the CPU may include determining 310 a CPU execution release time and a CPU execution resume time associated with the block application. For example and in some implementations, dynamic CPU multitasking process 10 may determine 302 or measure the actual time used by the file application when an operating system thread attempts to release the CPU. In some implementations, several cases may occur when a block application (e.g., operating system thread 132 of block application 128) attempts to release the CPU for a file application (e.g., file application 130). In one case, dynamic CPU multitasking process 10 may determine that the file application (e.g., file application 130) does not need the CPU, so no context-switch will occur. This may be referred to as a "Not Used Release" (NUR). In some implementations, a not used release (NUR) may indicate the number of times a CPU is released but not used by a non-block application (e.g., file application 130). In some implementations, dynamic CPU multitasking process 10 may measure the time before decreasing the priority (e.g., CPU execution release time associated with the block application) and after the operating system thread resumed executing (e.g., CPU execution resume time associated with the block application). In some implementations, the information about whether a context-switch happened or not may be obtained from the operating system (e.g. in Linux® 'getrusage').

In another case, dynamic CPU multitasking process 10 may determine 302 that the file application consumes less than the given time so the operating system thread was scheduled back. This may be referred to as a "Partly Used Release" (PUR). In some implementations, a partly used release (PUR) may indicate the number of times a non-block application consumes less than the time the CPU is released for such that an operating system thread switches back. In some implementations, dynamic CPU multitasking process 10 may determine 302 the non-block application execution utilization on the CPU by measuring the time before decreasing the execution priority of operating system thread (e.g., determining 310 a CPU execution release time associated with the block application) and the time after the operating system thread resumes (determining 312 a CPU execution resume time associated with the block application).

In yet another case, dynamic CPU multitasking process 10 may determine 302 that the file application (e.g., file application 130) consumes all the given time, therefore another operating system thread may increase the execution priority of the suspended operating system thread. This may be referred to as a "Fully Used Release" (FUR). In some implementations, a fully used release (FUR) may indicate the number of times a non-block application consumes all of the time the CPU is released for. In some implementations, dynamic CPU multitasking process 10 may determine 302 the non-block application execution utilization on the CPU by measuring the duration that the operating system thread was suspended. In some implementations, this non-block application execution utilization may also be obtained by the operating system thread that increases the execution priority of the suspended operating system thread indicating that it has increased the execution priority of the suspended operating system thread in memory visible to all operating system threads.

In some implementations, dynamic CPU multitasking process 10 may generate 304 a CPU execution release interval and CPU execution release duration for the block application based upon, at least in part, the block application execution utilization and the non-block application execution utilization. For example, and as discussed above, dynamic CPU multitasking process 10 may generate 304 a CPU execution release interval (CRI) that defines the continuous time that an operating system thread runs until it tries to release the CPU and a CPU execution release duration (CRD) that defines the maximum time the non-block application is given before the operating system thread of the block application is scheduled back. In some implementations, generating 304 the CPU execution release interval (CRI) and the CPU execution release duration (CRD) may be based upon, at least in part, the block application execution utilization (e.g., block application idle percentage (BIP) and block application used percentage (BUP)) and the non-block application execution utilization (e.g., a CPU execution release time and a CPU execution resume time associated with the block application based upon, at least in part, a number of not used releases (NURs), a number of partly used releases (PURs), and/or a number of fully used releases (FURs)).

In some implementations, generating 304 the CPU execution release interval and the CPU execution release duration for the block application based upon, at least in part, the block application execution utilization and the non-block application execution utilization may generally include prolonging the CPU execution release interval (CRI) when the non-block application (e.g., file application 130) is not fully consuming the granted time, to reduce the CPU release frequency and reduce the overhead resulting from frequent CPU releasing. In some implementations, generating 304 the CPU execution release interval and the CPU execution release duration for the block application based upon, at least in part, the block application execution utilization and the non-block application execution utilization may generally include prolonging the CPU execution release duration (CRD) when the non-block application (e.g., file application 130) has high CPU utilization while the block application has low CPU utilization.

In some implementations, generating 304 the CPU execution release interval and the CPU execution release duration for the block application may include comparing 312 the block application utilization against one or more block application utilization thresholds and comparing 314 the non-block application utilization against one or more non-block application utilization thresholds. In some implementations, dynamic CPU multitasking process 10 may receive and/or define one or more block application utilization thresholds and/or one or more non-block application utilization thresholds. For example, dynamic CPU multitasking process 10 may receive (e.g., from a user, from another process, etc.) one or more block application utilization thresholds. In some implementations, the one or more block application utilization thresholds may include a low block application idle percentage (BIP), a high block application idle percentage (BIP), a low block application used percentage (BUP), and a high block application used percentage (BUP). In some implementations, the low block application idle percentage may define a threshold minimum for a block application idle percentage indicative that the block application is very active on the CPU. Similarly, the low block application used percentage may define a threshold minimum for a block application use percentage indicative that the block application is not very active on the CPU. In some implementations, the high block application idle percentage may define a threshold maximum for a block application idle percentage indicative that the block application is inactive on the CPU. Similarly, the high block application used percentage may define a threshold maximum for a block application use percentage indicative that the block application is very active on the CPU. In some implementation and as will be discussed in greater detail below, these block application utilization thresholds may be used by dynamic CPU multitasking process 10 to generate 304 the CPU execution release interval and the CPU execution release duration.

In some implementations, the one or more non-block application utilization thresholds may include a low not used release (NUR) threshold, a high not used release (NUR) threshold, a low partly used release (PUR) threshold, a high partly used release (PUR) threshold, a low fully used release (FUR) threshold, and a high fully used release (FUR) threshold. In some implementations, the low not used release (NUR) threshold may define a threshold minimum number of times and/or amount of time that no non-block application is ready or available for execution on the CPU. Similarly, the low partly used release (PUR) threshold may define a threshold minimum number of times and/or amount of time that non-block applications consume less than the given time so an operating system thread is scheduled back and the low fully used release (FUR) threshold may define a threshold minimum number of times and/or amount of time that the non-block application(s) consume all of the time the CPU is released for. In some implementations, the high not used release (NUR) threshold may define a threshold maximum number of times and/or amount of time that no non-block application is ready or available for execution on the CPU. Similarly, the high partly used release (PUR) threshold may define a threshold maximum number of times and/or amount of time that non-block applications consume less than the given time and the high fully used release (FUR) threshold may define a threshold maximum number of times and/or amount of time that the non-block application(s) consume all of the time the CPU is released for. In some implementation and as will be discussed in greater detail below, these non-block application utilization thresholds may be used by dynamic CPU multitasking process 10 to generate 304 the CPU execution release interval and the CPU execution release duration. In some implementations, the actual block application utilization thresholds and non-block application utilization thresholds may be user-defined, pre-defined, and/or automatically defined by dynamic CPU multitasking process 10.

In some implementations, dynamic CPU multitasking process 10 may release 316 the CPU from executing the block application for a predefined CPU execution release duration and a predefined CPU execution release interval based upon, at least in part, the CPU execution release interval and the CPU execution release duration. Referring also to the example of FIG. 7 and in some implementations, dynamic CPU multitasking process 10 may execute a first sub-thread (e.g., first sub-thread 134) of an operating system thread (e.g., operating system thread 132) for a period of time (e.g., 50 µs). At time "t0", dynamic CPU multitasking process 10 may release the CPU from executing the block application for a predefined execution release duration and a predefined execution release interval. In this example, dynamic CPU multitasking process 10 may initially release 316 the CPU for e.g., 50 µs every e.g., 50 µs. At time "t1", no non-block application may be ready or available to execute on the CPU and dynamic CPU multitasking process 10 may determine that at time "t1", a not used release (NUR) occurred.

Figure 7:
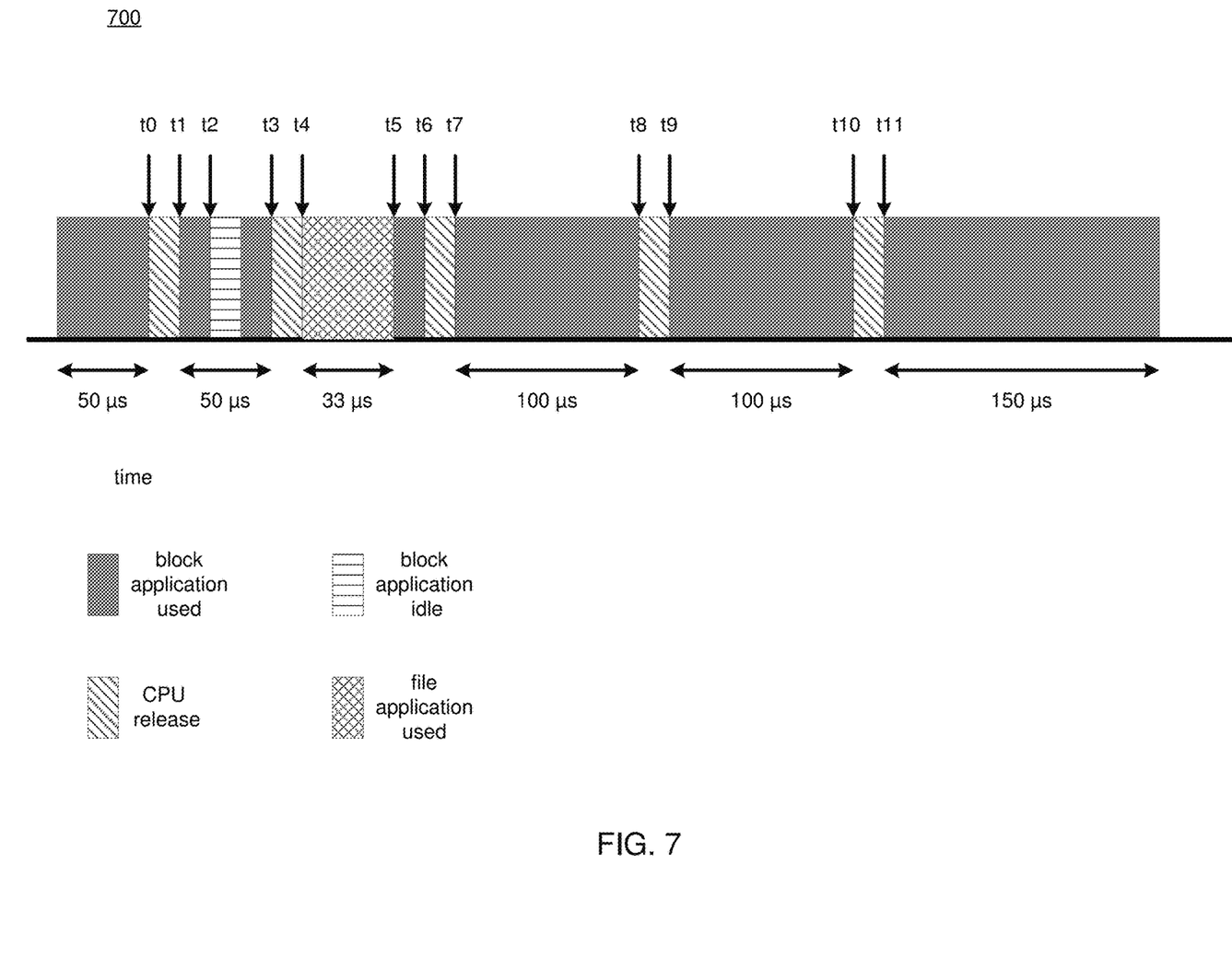

Accordingly and as discussed above, dynamic CPU multitasking process 10 may resume execution the operating system thread (e.g., operating system thread 132) of a block application (e.g., block application 128). At time "t2", dynamic CPU multitasking process 10 may determine or measure a period of time where block application 128 is idle. After the CPU execution release interval (e.g., 50 µs) at time "t3", dynamic CPU multitasking process 10 may release 316 the CPU from executing block application 128 for a predefined execution release duration (e.g., 50 µs). In this example, at time "t4" or after the CPU is released, dynamic CPU multitasking process 10 may execute a non-block application (e.g., file application 130) on the CPU. At time "t5", however, file application 130 may finish its execution before the end of the CPU release duration (e.g., 50 µs). In this example, dynamic CPU multitasking process 10 may determine that at time "t5", a partly used release (PUR) occurred (e.g., file application 130 executes for only 33 µs). Additionally at time "t5", dynamic CPU multitasking process 10 may execute operating system thread 132 of block application 128 in response to file application 130 finishing its execution before the end of the CPU release duration.

In some implementations, generating 304 the CPU execution release interval and the CPU execution release duration for the block application may include incrementally adjusting 318 one or more of a previous CPU execution release interval and a previous CPU execution release duration. Returning again to the example of FIG. 7 and in some implementations, at time "t6", dynamic CPU multitasking process 10 may generate 304 a CPU execution release interval and CPU execution release duration for the block application based upon, at least in part, the block application execution utilization and the non-block application execution utilization. For example, in response to determining that file application 130 had a high NUR (e.g., where the NUR threshold for high NUR, in this example, is e.g., one or more NURs in less than three CPU release intervals), dynamic CPU multitasking process 10 may incrementally adjust 318 one or more of a previous CPU execution release interval and a previous CPU execution release duration (e.g., adjust 318 the CPU execution release duration from e.g., 50 µs to e.g., 100 µs). At time "t6", dynamic CPU multitasking process 10 may release 316 the CPU from executing the block application for the adjusted execution release duration (e.g., 50 µs) and the adjusted execution release interval (e.g., 100 µs). At time "t7", no non-block application may be ready or available to execute on the CPU and dynamic CPU multitasking process 10 may determine that at time "t7", a not used release (NUR) occurred. Accordingly and as discussed above, dynamic CPU multitasking process 10 may resume execution the operating system thread (e.g., operating system thread 132) of a block application (e.g., block application 128). This may be repeated at time "t8" where dynamic CPU multitasking process 10 may release 316 the CPU from executing the block application at the adjusted execution release interval (e.g., 100 µs) and at time "t9", dynamic CPU multitasking process 10 may determine that a not used release (NUR) occurred.

In this example, dynamic CPU multitasking process 10 may generate 304 a CPU execution release interval and CPU execution release duration for the block application based upon, at least in part, the block application execution utilization and the non-block application execution utilization. For example, in response to determining that file application 130 had a high NUR (e.g., where the NUR threshold for high NUR, in this example, is e.g., one or more NURs in less than three CPU release intervals), dynamic CPU multitasking process 10 may incrementally adjust 318 one or more of a previous CPU execution release interval and a previous CPU execution release duration (e.g., adjust 318 the CPU execution release interval from e.g., 100 µs to e.g., 150 µs). At time "t10", dynamic CPU multitasking process 10 may release 316 the CPU from executing the block application at the adjusted execution release interval (e.g., 150 µs). At time "t11", dynamic CPU multitasking process 10 may determine that a not used release (NUR) occurred. While the period of time between releasing the CPU and either the file application executing or the operating system thread executing on the CPU is shown as a relatively large amount of time on the timeline of FIG. 7, it will be appreciated that this is for example purposes only as the switch time between releasing the CPU and executing the file application or the operating system thread may be much smaller than the CPU execution release duration or CPU execution release interval. It will also be appreciated that incrementally adjusting 318 one or more of the CPU execution release interval and the CPU execution release duration may occur at any time or interval and/or in response to any change in the block application execution utilization and/or the non-block application execution utilization within the scope of the present disclosure.

In some implementations, generating 304 the CPU execution release interval and the CPU execution release duration for the block application may include one or more of: increasing 320 the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds, and decreasing 322 the previous CPU execution release interval and increasing the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds.

Referring again to the example of FIG. 7 and as discussed above, dynamic CPU multitasking process 10 may increase 320 the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds. As discussed above and as shown in the example of FIG. 7, dynamic CPU multitasking process 10 may incrementally increase the CPU execution release interval from e.g., 50 μs to e.g., 100 μs and finally to e.g., 150 μs. For example, at time "t6", dynamic CPU multitasking process 10 may increase 320 the previous CPU release interval from e.g., 50 μs to e.g., 100 μs in response to comparing the non-block application utilization to one or more non-block application utilization thresholds (e.g., NUR threshold for high NUR, in this example, is e.g., one or more NURs in less than three CPU release intervals).

Similarly, at time "t10", dynamic CPU multitasking process 10 may increase 320 the previous CPU release interval from e.g., 100 μs to e.g., 150 μs in response to comparing the non-block application utilization to one or more non-block application utilization thresholds (e.g., NUR threshold for high NUR, in this example, is e.g., one or more NURs in less than three CPU release intervals). While the example of FIG. 7 increases the CPU execution release interval by e.g., 50 μs, it will be appreciated that the CPU execution release interval (CRI) may be increased by any amount of time and/or may be increased incrementally by any amount (i.e., increased by different amounts of time) within the scope of the present disclosure.

In some implementations, the CPU execution release interval (CRI) and/or the CPU execution release duration (CRD) may be adjusted gradually, to let the storage system adapt to the CPU usage changes of the applications and avoid major changes in the CPU allocation which may cause to increased latency and starvation issues. Adjusting these durations may allow the relevant application run for longer durations without incurring a priority change penalty, when the other application is idle or only requires low CPU utilization.

In some implementations, dynamic CPU multitasking process 10 may decrease 322 the previous CPU execution release interval and increase the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds. Referring also to the example of FIG. 8 and in some implementations, dynamic CPU multitasking process 10 may execute a sub-thread (e.g., first sub-thread 134) of an operating system thread (e.g., operating system thread 132) on a CPU (e.g., CPU 126).

Figure 8:
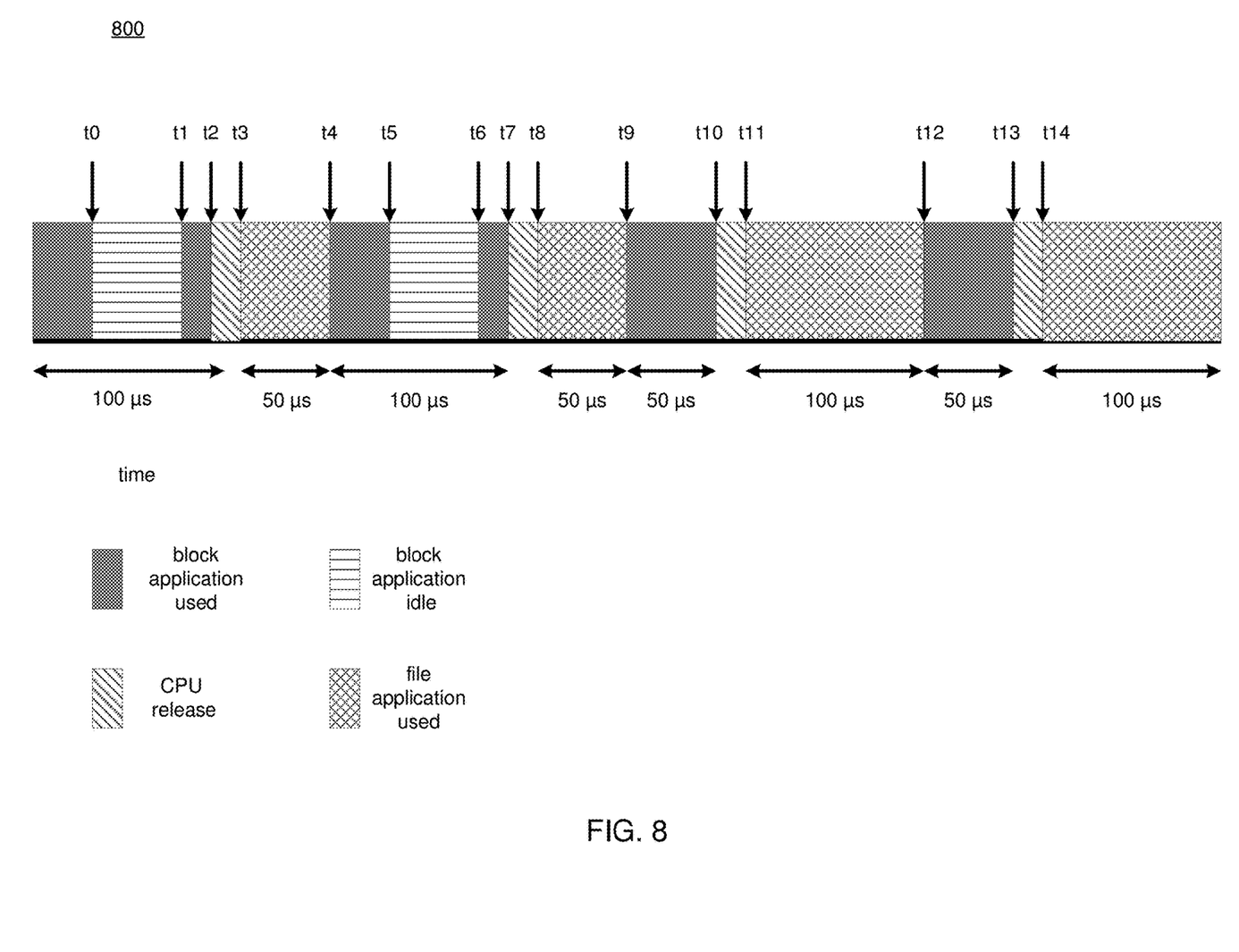

In this example, dynamic CPU multitasking process 10 may determine that at time "t0", the operating system thread is idle until time "t1". At time "t2", dynamic CPU multitasking process 10 may release the CPU from executing the block application for a predefined CPU execution release duration and a predefined CPU execution release interval. In this example, the predefined CPU execution release duration may be e.g., 50 μs and the predefined CPU execution release interval may be e.g., 100 μs. However, it will be appreciated that the predefined CPU execution release interval and the predefined CPU execution release duration may be any value within the scope of the present disclosure.

At time "t3", dynamic CPU multitasking process 10 may execute a non-block application (e.g., file application 130) on the CPU for e.g., 50 μs or the entire predefined CPU execution release duration. In this example, dynamic CPU multitasking process 10 may have raised the priority of the suspended operating system thread in order to schedule back operating system thread 132 after the end of the predefined CPU execution release duration. Accordingly, dynamic CPU multitasking process 10 may determine that a full used release (FUR) occurred at time "t4". At time "t4", another operating system thread may raise the priority of operating system thread 132 such that operating system thread 132 wakes up and resumes executing on the CPU. In this example, dynamic CPU multitasking process 10 may determine that at time "t5" until time "t6", the operating system thread is idle. At time "t7" (e.g., after the predefined CPU execution release interval of e.g., 100 μs), dynamic CPU multitasking process 10 may release 316 the CPU from executing the block application for the predefined CPU execution release duration (e.g., 50 μs) and the predefined CPU execution release interval (e.g., 100 μs).

At time "t8", a non-block application (e.g., file application 130) may execute for the entire predefined CPU execution release duration (e.g., 50 μs). In this example, dynamic CPU multitasking process 10 may have raised the priority of the suspended operating system thread in order to schedule back operating system thread 132 after the end of the predefined CPU execution release duration. Accordingly, dynamic CPU multitasking process 10 may determine that a full used release (FUR) occurred at time "t9". At time "t9", another operating system thread may raise the priority of operating system thread 132 such that operating system thread 132 wakes up and resumes executing on the CPU.

In some implementations, at time "t10", dynamic CPU multitasking process 10 may decrease 322 the previous CPU execution release interval and increase the previous CPU execution release duration in response to determining a high non-block application utilization and a low block application utilization. In this example and in response to determining a high FUR (e.g., two or more FUR occurrences in this example) and in response to determining that the block application idle percentage (BIP) is high (e.g., greater than or equal to 50% in this example), dynamic CPU multitasking process 10 may decrease 322 the previous CPU execution release interval from e.g., 100 μs to e.g., 50 μs and increase the previous CPU execution release duration from e.g., 50 μs to e.g., 100 μs. Accordingly, dynamic CPU multitasking process 10 may release the CPU at time "t11" for the adjusted CPU execution release duration (e.g., 100 μs) at the adjusted CPU execution release interval (e.g., 50 μs). At time "t12", a non-block application (e.g., file application 130) may execute for the entire predefined CPU execution release duration (e.g., 100 μs). In this example, dynamic CPU multitasking process 10 may have raised the priority of the suspended operating system thread in order to schedule back operating system thread 132 after the end of the predefined CPU execution release duration.

Accordingly, dynamic CPU multitasking process 10 may determine that a full used release (FUR) occurred at time "t12". At time "t12", another operating system thread may raise the priority of operating system thread 132 such that operating system thread 132 wakes up and resumes executing on the CPU. At time "t13", dynamic CPU multitasking process 10 may release the CPU for the adjusted CPU execution release duration (e.g., 100 μs) at the adjusted CPU execution release interval (e.g., 50 μs). In this manner, dynamic CPU multitasking process 10 may continue to dynamically adjust the CPU execution release duration and/or the CPU execution release interval. In some implementations, dynamic CPU multitasking process 10 may continue to incrementally adjust 318 one or more of the previous CPU execution release interval and the previous CPU execution release duration.

In some implementations, when dynamic CPU multitasking process 10 determines that the CPU utilization of a non-block application (e.g., file application 130) increases, the corresponding CPU execution release interval and/or CPU execution release duration may be decreased exponentially, to prevent starvation.

In some implementations, generating 304 the CPU execution release interval and the CPU execution release duration for the block application may include incrementally adjusting 318 one or more of a previous CPU execution release interval and a previous CPU execution release duration as shown below in the example scenarios of Table 1:

TABLE 1

| Scenario | Block application condition | File application condition | Action by dynamic CPU multitasking process 10 | Result |
|---|---|---|---|---|
| High utilization by block application, low utilization by file application | Low BIP (Block is not idle) | High NUR (File doesn't use CPU) | Increase CRI | Block application is executed for longer duration, overhead is reduced as the CPU release frequency decreases. |
| High utilization by file application, fully utilizing given time | Low BIP | High FUR | Increase CRD | File application is executed for longer duration, overhead is reduced as the CPU release frequency decreases. |
| High utilization by file application and low utilization by block application | High BIP | High FUR | Decrease CRI Increase CRD | File application is executed for longer duration, overhead is reduced as the CPU release frequency decreases. |
| Medium utilization by file application with CPU releases too frequently | — | High PUR | Increase CRI | File application aggregates more work to execute for longer continues durations. |
| File application becomes active after being idle | High CRI | Low CRD High FUR | Decrease CRI | File application is executed on the CPU more frequently. |
| Block application becomes active after being idle | Low CRI Low BIP | | Increase CRI | Block application executes on the CPU for longer durations. |

While Table 1 may provide example scenarios of how dynamic CPU multitasking process 10 may incrementally adjust 318 one or more of a previous CPU execution release interval and a previous CPU execution release duration, it will be appreciated that other configurations in the block and non-block application utilizations and other scenarios are possible for adjusting the CPU execution release interval and the CPU execution release duration within the scope of the present disclosure. In some implementations, the amount by which the CPU execution release duration and/or the CPU execution release interval are adjusted may depend on storage system requirements and may be tuned accordingly. For example, the amount and frequency by which the CPU execution release duration and/or the CPU execution release interval are adjusted may be based upon, at least in part, a block application latency requirement, a requirement to set a limit on the ratio between the block application execution utilization and the file application execution utilization, etc.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   determining a block application execution utilization on a central processing unit (CPU) of the computing device;
   determining a non-block application execution utilization on the CPU, wherein determining the non-block application execution utilization on the CPU includes determining a CPU execution release time and a CPU execution resume time associated with the block application, wherein determining the CPU execution release time and a CPU execution resume time associated with the block application includes, at least in part, determining a threshold minimum number of times the CPU was released by the block application and not used by the non-block application; and
   generating a CPU execution release interval and CPU execution release duration for the block application based upon, at least in part, the block application execution utilization and the non-block application execution utilization.

2. The computer-implemented method of claim 1, further comprising:
   releasing the CPU from executing the block application for a predefined CPU execution release duration and a predefined CPU execution release interval based upon, at least in part, the CPU execution release interval and the CPU execution release duration.

3. The computer-implemented method of claim 1, wherein determining the block application execution utilization on the CPU includes:
 determining a percentage of time the block application is idle, and
 determining a percentage of time the block application is used.

4. The computer-implemented method of claim 1, wherein generating the CPU execution release interval and the CPU execution release duration for the block application includes:
 comparing the block application utilization against one or more block application utilization thresholds, and
 comparing the non-block application utilization against one or more non-block application utilization thresholds.

5. The computer-implemented method of claim 4, wherein generating the CPU execution release interval and the CPU execution release duration for the block application includes incrementally adjusting one or more of a previous CPU execution release interval and a previous CPU execution release duration.

6. The computer-implemented method of claim 5, wherein generating the CPU execution release interval and the CPU execution release duration for the block application includes one or more of:
 increasing the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds, and
 decreasing the previous CPU execution release interval and increasing the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds.

7. A computer program product residing on a non-transitory computer readable medium having a plurality of instructions stored thereon which, when executed by a processor, cause the processor to perform operations comprising:
 determining a block application execution utilization on a central processing unit (CPU) of a computing device;
 determining a non-block application execution utilization on the CPU, wherein determining the non-block application execution utilization on the CPU includes determining a CPU execution release time and a CPU execution resume time associated with the block application, wherein determining the CPU execution release time and a CPU execution resume time associated with the block application includes, at least in part, determining a threshold minimum number of times the CPU was released by the block application and not used by the non-block application; and
 generating a CPU execution release interval and CPU execution release duration for the block application based upon, at least in part, the block application execution utilization and the non-block application execution utilization.

8. The computer program product of claim 7, wherein the operations further comprise:
 releasing the CPU from executing the block application for a predefined execution release duration and a predefined execution release interval based upon, at least in part, the CPU execution release interval and the CPU execution release duration.

9. The computer program product of claim 7, wherein determining the block application execution utilization on the CPU includes:
 determining a percentage of time the block application is idle, and
 determining a percentage of time the block application is used.

10. The computer program product of claim 7, wherein generating the CPU execution release interval and the CPU execution release duration for the block application includes:
 comparing the block application utilization against one or more block application utilization thresholds, and
 comparing the non-block application utilization against one or more non-block application utilization thresholds.

11. The computer program product of claim 10, wherein generating the CPU execution release interval and the CPU execution release duration for the block application includes incrementally adjusting one or more of a previous CPU execution release interval and a previous CPU execution release duration.

12. The computer program product of claim 11, wherein generating the CPU execution release interval and the CPU execution release duration for the block application includes one or more of:
 increasing the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds, and
 decreasing the previous CPU execution release interval and increasing the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds.

13. A computing system comprising:
 a memory; and
 a processor configured to determine a block application execution utilization on a central processing unit (CPU) of a computing device, the processor further configured to determine a non-block application execution utilization on the CPU, wherein determining the non-block application execution utilization on the CPU includes determining a CPU execution release time and a CPU execution resume time associated with the block application, wherein determining the CPU execution release time and a CPU execution resume time associated with the block application includes, at least in part, determining a threshold minimum number of times the CPU was released by the block application and not used by the non-block application, and the processor further configured to generate a CPU execution release interval and CPU execution release duration for the block application based upon, at least in part, the block application execution utilization and the non-block application execution utilization.

14. The computing system of claim 13, wherein the processor is further configured to:
release the CPU from executing the block application for a predefined execution release duration and a predefined execution release interval based upon, at least in part, the CPU execution release interval and the CPU execution release duration.

15. The computing system of claim 13, wherein determining the block application execution utilization on the CPU includes:
determining a percentage of time the block application is idle, and
determining a percentage of time the block application is used.

16. The computing system of claim 13, wherein generating the CPU execution release interval and the CPU execution release duration for the block application includes:
comparing the block application utilization against one or more block application utilization thresholds, and
comparing the non-block application utilization against one or more non-block application utilization thresholds.

17. The computing system of claim 16, wherein generating the CPU execution release interval and the CPU execution release duration for the block application includes incrementally adjusting one or more of a previous CPU execution release interval and a previous CPU execution release duration.

18. The computer-implemented method of claim 1, wherein determining the CPU execution release time and a CPU execution resume time associated with the block application includes:
determining a threshold minimum number of times the CPU was released by the block application and partially used by the non-block application.

19. The computer-implemented method of claim 1, wherein determining the CPU execution release time and a CPU execution resume time associated with the block application includes:
determining a threshold minimum number of times the CPU was released by the block application and fully used by the non-block application.

* * * * *